United States Patent [19]

Smith et al.

[11] Patent Number: 5,504,132
[45] Date of Patent: Apr. 2, 1996

[54] SOLVENT FREE OIL SOLUBLE DRAG REDUCING POLYMER SUSPENSION

[75] Inventors: Ken W. Smith; Leo V. Haynes; Debora F. Massouda, all of Ponca City, Okla.

[73] Assignee: Conoco Inc., Ponca City, Okla.

[21] Appl. No.: 421,577

[22] Filed: Apr. 12, 1995

Related U.S. Application Data

[60] Division of Ser. No. 234,686, May 6, 1994, Pat. No. 5,449,732, which is a continuation-in-part of Ser. No. 80,422, Jun. 18, 1993, abandoned.

[51] Int. Cl.⁶ .................................. C08J 7/04; C08K 3/36
[52] U.S. Cl. .................. 524/401; 524/442; 524/445; 524/451; 525/240; 526/348.3
[58] Field of Search .................................. 524/401, 442, 524/445, 451; 525/240; 526/348.3

[56] References Cited

U.S. PATENT DOCUMENTS

| | | |
|---|---|---|
| 3,669,948 | 6/1972 | Konotsune et al. . |
| 3,692,676 | 9/1972 | Culter et al. . |
| 3,736,288 | 5/1973 | Stratta et al. ..................... 260/33.4 R |
| 3,791,913 | 2/1974 | Strate et al. . |
| 3,884,252 | 5/1975 | Kruka . |
| 3,951,935 | 4/1976 | Engelmann . |
| 4,147,677 | 4/1979 | Lundberg et al. . |
| 4,212,312 | 7/1980 | Titus . |
| 4,263,926 | 4/1981 | Drake et al. . |
| 4,340,076 | 7/1982 | Weitzen . |
| 4,358,572 | 11/1982 | Mack et al. . |
| 4,371,455 | 2/1983 | Mack et al. . |
| 4,384,089 | 5/1983 | Dehm . |
| 4,415,714 | 11/1983 | Mack . |
| 4,433,123 | 2/1984 | Mack . |
| 4,493,903 | 1/1985 | Mack . |
| 4,493,904 | 6/1985 | Mack . |
| 4,584,244 | 4/1986 | Fenton . |
| 4,720,397 | 1/1988 | O'Mara et al. . |
| 4,826,728 | 5/1989 | O'Mara et al. . |
| 4,837,249 | 6/1989 | O'Mara et al. . |
| 4,945,142 | 7/1990 | Gessell et al. . |
| 5,244,937 | 9/1993 | Lee et al. ................................ 523/204 |

FOREIGN PATENT DOCUMENTS 901727  5/1972  Canada .

OTHER PUBLICATIONS

John Boor, Jr., *Ziegler–Natta Catalysts and Polymerizations*, "Chapter 18, Kinetics", Academic Press, 1979.

Tad W. Taylor, Kyu Y. Choi, Hulgen Yuan, and W. Harmon Ray, "Physiochemical Kinetics of Liquid Phase Propylene Polymerization", pp. 191 to 223 in *Transition Metal Catalyzed Polymerizations, Alkenes and Dienes, Part A*, edited by Roderic P. Quirk, Henry Hsieh, G. Bruce Klingensmith and Peter J. T. Tait, MMI Press, 1983.

B. M. Grieveson, Kinetics of the Polymerization of Ethylene with a Ziegler–Natta Catalyst, *Die Makromolekulare Chemie*, vol. 84, (1965), pp. 93–107.

Lutz Wohlfarth, Jens Reussner and Manfred Arnold, *Alternating Copolymerization of Butadiene and Propene with the $VO(ONeo)_2Cl/Al(iso-Bu)_3$ System 2: Influence of Electron Donors at a Polymerization Temperature of –45 C* Plaste und Kautschuk, (38(9) 297–8 (1991).

*Primary Examiner*—David W. Wu
*Attorney, Agent, or Firm*—Cortlan R. Schupbach

[57] ABSTRACT

A hydrocarbon soluble drag reducing suspension is described as well as a process for obtaining the same. Process is directed toward producing a drag reducing product which is easily transportable, non-hazardous, easily handled and while providing a significant increase in drag reduction capability over existing commercial products. The suspension is preferably substantially solvent-free.

5 Claims, 1 Drawing Sheet

SOLVENT FREE OIL SOLUBLE DRAG REDUCING POLYMER SUSPENSION

This is a division of application Ser. No. 08/234,686 filed May 6, 1994; now U.S. Pat. No. 5,449,732 which was a continuation-in-part of Ser. No. 08/080,422 filed Jun. 18, 1993, now abandoned.

BACKGROUND OF THE INVENTION

This invention generally relates to the preparation and use of non-crystalline high molecular weight hydrocarbon soluble drag reducing polymers.

More specifically this invention relates to a method for producing a highly active, non-hazardous, easily transported and easily handled suspension of drag reducing polymers having increased performance characteristics.

It is known that certain polymers which are oil soluble may be polymerized in the presence of catalysts to produce high molecular weight non-crystalline hydrocarbon soluble materials by various means. These polymers, when dissolved in a hydrocarbon fluid flowing through a conduit, greatly reduce turbulent flow and decrease "drag" thus reducing the amount of horsepower needed to move a given volume of fluid or conversely, enabling greater volumes of fluid to be moved with a given amount of power. Further, dilute solutions of high molecular weight polymers in solvents such as hydrocarbons, display useful flow characteristics unusual to the commonly known crystalline, largely non-soluble, artifact-forming polymers such as polyethylene and polypropylene. In particular, these hydrocarbon soluble materials are noted for their effectiveness as drag reducing agents and anti-misting agents. An anti-misting agent is a polymer which, when dissolved in a hydrocarbon, serves to significantly increase medium droplet size and thereby reduce flammability of fuel sprays caused by high velocity wind shear, such as that as which occurs during rupture of a fuel cell resulting from impact such as an airplane crash.

One important aspect of such polymers are their susceptibility to shear degradation when dissolved in hydrocarbons. Thus, passage through a pump, severe constrictions in the pipeline or the like where turbulent flow is encountered can shear the polymer and thereafter reduce its effectiveness. Consequently, it is important that these polymers be placed into the flowing hydrocarbon in a form which achieves certain desirable features.

The polymer should be placed in a form adequate for easy transportation and handling without exotic or unusual equipment, since injection points can often be at remote and inaccessible locations. The polymer must also be a form which dissolves rapidly in the hydrocarbon being transported, since the polymers have little drag reducing effect until solubilized. The polymer should also be innocuous to the ultimate purpose of the hydrocarbon fluid. For example, in the case of a crude oil flowing through a pipeline, larger amounts of water and contaminants can be tolerated than in a finished pipeline product such as diesel fuel or gasoline which are ultimately destined to be consumed in internal combustion engines or the like.

At the present time, a number of different commercial approaches have been taken to the problem of preparing, dissolving, transporting and using such drag reducing polymers. In use, these polymers form extremely dilute solutions (ranging up to about 100 parts per million polymer in hydrocarbon) which are effective in order to achieve drag reduction or anti-misting. The common commercial method is the preparation of dilute solutions of polymer in an inert solvent such as kerosene or other solvating material as set forth in Mack, U.S. Pat. No. 4,433,123. Mack utilized a solution of high molecular weight polymer suitable for use as a drag reducing agent when produced by polymerization of alphaolefin in a hydrocarbon solvent. The entire mixture, containing polyolefin, solvent and catalyst particles, is used without separation to form dilute solutions of the polymer in crude oil or other hydrocarbon. However, one disadvantage of such an approach is the use of a solvent, which poses a shipping and handling hazard. In addition, the product itself forms a gel-like solution which requires pressurized injection equipment and which becomes extremely viscous and difficult to handle under cold weather temperature conditions at pipeline injection points.

In addition, using solution polymerization processes, it has been found necessary to terminate reactions at no more than 20% polymer based on total reactor content by weight in order to obtain the high molecular weight polymers in an effective form, as taught in U.S. Pat. Nos. 4,415,714, 4,493,903, and 4,945,142.

A second approach is to prepare the polymers as a solid material as described in the Weitzen patent, U.S. Pat. No. 4,340,076. Weitzen taught that a high molecular weight polymer would very rapidly dissolve in solvents if the polymer was ground very fine at cryogenic temperatures and the resulting polymer particles were introduced into the solvent while below the glass transition point of the polymer. Polymer concentrations as high as 15 percent or more could easily be obtained, although only a few parts per million were needed for drag reduction. Three patents issued to O'Mara et al., U.S. Pat. Nos. 4,720,397, 4,826,728 and 4,837,249 all deal with finely grinding or commuting the polymers in an inert atmosphere below the glass transition point of the polymer in the presence of a partitioning agent to form a multi-layered coating which holds the inert atmosphere adjacent to the polymer particles after being ground. The patentee teaches it is mandatory that the comminution be carried out in an inert atmosphere utilizing a refrigerant such as liquid nitrogen and a coating agent while grinding the polymer to a size of less than about 0.5 millimeters or about 35 mesh. This process requires that particles be maintained in an inert atmosphere without contacting water or oxygen until dissolved in the hydrocarbon solvent.

Thus, it is necessary either to have an impervious particle coating which prevents air or water from contacting the particle until dissolved, or the entire system must be maintained under an inert atmosphere until the material is dissolved. This process would be bulky and cumbersome, especially at remote pipeline locations.

In the most successful commercial approach, the entire reaction mixture of a polymerization process, comprising a high molecular weight polymer dissolved in a polymerization solvent such as hexane, heptane or kerosene in a concentration ranging from as low as 2 to 3 percent to a maximum of about 12 percent is utilized. While this material has proven to be difficult to pump under cold weather conditions, it is presently the most economical way to utilize polymer reaction products as drag reducing materials.

All commercial processes or known processes to date for the preparation of polymers useful for drag reducing or anti-misting purposes have significant disadvantages. Clearly, dissolving solid particles directly into crude oil requires injecting solids into liquids, or as an alternative, pre-dissolving the solids into liquids and injecting liquid into the flowing hydrocarbon. Either method requires additional equipment not normally utilized in pipeline locations and pump stations, and requires significant handling equipment investment. For example, U.S. Pat. No. 4,340,076, requires a source of liquid nitrogen for its operation. The present commercial approach utilizing the entire polymerization mixture containing solvent is unwieldy because the polymer solution must be transported as a hazardous material and stored in pressure vessels. The product is a viscous polymer solution, making handling unwieldy under low temperature conditions. The limitation on polymer content of 10 to 15 percent in current commercial processes also means that a great deal of shipping cost is incurred relative to the active polymer content.

THE PRIOR ART

Drag reducing polymers are described in the art. Representative but non-exhaustive examples of such art are U.S. Pat. No. 3,692,676, which teaches a method for reducing friction loss or drag for pumpable fluids through pipelines by adding a minor amount of the high molecular weight noncrystalline polymer. U.S. Pat. No. 3,884,252 teaches the use of polymer chunks as a drag reducing material. These materials are extremely visco-elastic and are not suitable for forming injection molded or blow molded articles. In general, these have no known use other than as drag reducing materials. The very properties that make these materials extremely effective as drag reducing additives make them extremely difficult to handle since they have a severe tendency to cold flow or reagglomerate.

The general propensity of non-crosslinked polymeric material to cold flow and reagglomerate is well known. Numerous attempts have been made to overcome the disadvantages inherent in solid cold flow in polymers. Representative but non-exhaustive of such art is that described in U.S. Pat. No. 3,791,913 when elastomeric pellets are surfaced cured to a minor depth in order to maintain the unvulcanized interior of the polymer in a sack of cured material. U.S. Pat. No. 4,147,677 describes a method of preparing a free flowing finely divided powder of neutralized sulphonated elastomer by mixing with fillers and oils. U.S. Pat. No. 3,736,288 teaches solutions of drag reducing polymers in inert normally liquid vehicles for addition to liquids flowing in conduits achieving a staggered dissolution effect by varying the size of the polymer particles. Suspending with surface active agents are also shown. U.S. Pat. No. 4,340,076 shows a process for dissolving high molecular weight hydrocarbon polymer in liquid hydrocarbons by comminuting the polymer into discreet particles and contacting these materials at near cryogenic temperatures with the liquid hydrocarbons to more rapidly dissolve the polymer. U.S. Pat. No. N4,584,244 cryogrinds drag reducing polymers under liquid nitrogen with alumina to obtain a free-flowing friable solid drag reducing composition.

U.S. Pat. Nos. 4,720,397, 4,826,728 and 4,837,249 all to O'Mara et al. deal with processes and compositions around a rapid dissolving polymer composition or in the polymer cryoground below glass transition temperatures and while the surfaces are freshly cleaved in an inert atmosphere, coating the material with a coating which holds the inert atmosphere adjacent to the polymer until dissolved in the hydrocarbon. U.S. Pat. No. 4,212,312 deals with drag reducing polymers which are particulated and placed into a low boiling solvent which is water immiscible together with surfactants to form an emulsion and the solvent is removed from the emulsion.

Canadian patent 901,727 deals with a process of continuous polymerization. The process utilizes two rolls of sheeting which are formed into an envelope with a nonsealed but rolled edge. A liquid polymerization mixture is placed into the cavity formed by joining the two sheets. The process is useful for formation of compounds with polymerizable oxygen function such as ethers, acetals, ketals and esters. The enclosure is maintained until the polymerization is complete, whereupon the plastic sheet is recovered and the long strip of polymerized polymer is recovered.

U.S. Pat. No. 5,244,937 teaches that cryoground drag reducing polymers can be suspended in water using a thickening agent and placed into flowing hydrocarbons as a suspension.

It is therefore an object of the present invention to overcome the disadvantages of the prior art and to provide a particulate, substantially noncrystalline, ultra high molecular weight, hydrocarbon soluble polyolefin polymer which is useful to improve flow of hydrocarbons in conduits. Other objects will become apparent to those skilled in this art as the description proceeds.

THE PRESENT INVENTION

The present invention relates to a bulk polymerization method for the rapid production of oil soluble drag reducing polymer, which bulk polymerized polymer is reduced to particles and slurried in water to create a high solids, low viscosity product. The reaction product further contains additives needed during manufacturing or needed to impart certain properties.

Advantages of the process and product of the present invention over the current commercial drag reducing products include a sufficiently low viscosity to flow by gravity to the injection pump suction, and eliminating the need for pressure vessels which significantly add to handling costs. Further, the material contains a significantly higher concentration of polymer per volume which reduces the cost of transportation. As pressure vessels are not needed, the size and weight of each container can be reduced. The material of the present invention in form, appearance and behavior closely resembles latex paint. No significant amount of solvents or hydrocarbons need to be involved, reducing handling and exposure hazards.

The drag reducers of the present invention are produced by bulk polymerization of olefin monomers to form an ultra-high molecular weight polymer, cryogrinding the polymer to a fine powder and mixing the powder with water and additives to achieve a stable slurry. Although solvents can be used with bulk polymerization processes, it is preferred that the reaction and product be as solvent free as possible, providing a substantially solvent free polymerization process and drag reducing product. Normally, the bulk polymerization reactor contents will contain at least 80% polymer by weight. The reactive olefins are normally substantially totally polymerized (above 95% polymer content by weight), although the reactor can be viscosity modified by the addition of non-reactive components such as diluent hydrocarbons. Reactive olefins will normally comprise at least 80% of the total reactor content, and preferably 90% of the total reactor content. The most preferred embodiment will be carried out with the reactor containing at least 95% reactive olefins by weight.

More specifically, the present invention relates to the bulk polymerization of alphaolefins containing from 2 to 30 carbon atoms wherein bulk polymerization is carried out above 0° F. while removing sufficient heat of reaction to allow formation of a substantially non-crystalline, hydrocarbon soluble, ultra-high molecular weight polymer having an inherent viscosity (IV) of at least 25 deciliters/gram (dL/g). Preferably, the bulk polymerization is carried out in a reaction vessel comprising barrier plastics. The reaction vessel is consumed with the final product, through the chopping and cryogrinding of the produced polymer and reaction enclosure. Where polymerization is carried out using catalysts requiring exclusion of oxygen and water, the barrier plastics utilized are both oxygen and water barrier polymers which are normally layered to prevent the passage of either water or oxygen to the polymerization system. Usually these oxygen barrier polymers are sandwiched between layers of highly effective water barrier polymers such as polyethylenes, polypropylenes or polybutylenes to provide the necessary reaction enclosure or reaction vessel to achieve ultra high molecular weight polyolefins and allowing the reaction to proceed to essential completion by avoiding catalyst deactivation by water or oxygen.

One important feature of the present invention is that the containers in which the reaction is carried out are sized to provide minimum cross sectional area to dissipate the high heat of reaction, such that the reactor used, conventional or consumable, has a smallest dimension no greater than 9 inches. The advantage of the present invention using a disposable reactor resides in processing in that the reaction product polymer is sticky and agglomerates as formed. In the preferred process of the present invention, the reactor is disposable and is consumed with the polymer in the final end use, eliminating the costly requirement of obtaining, cleaning and maintaining conventional reactors.

Specific Description of the Invention

Figure 1:
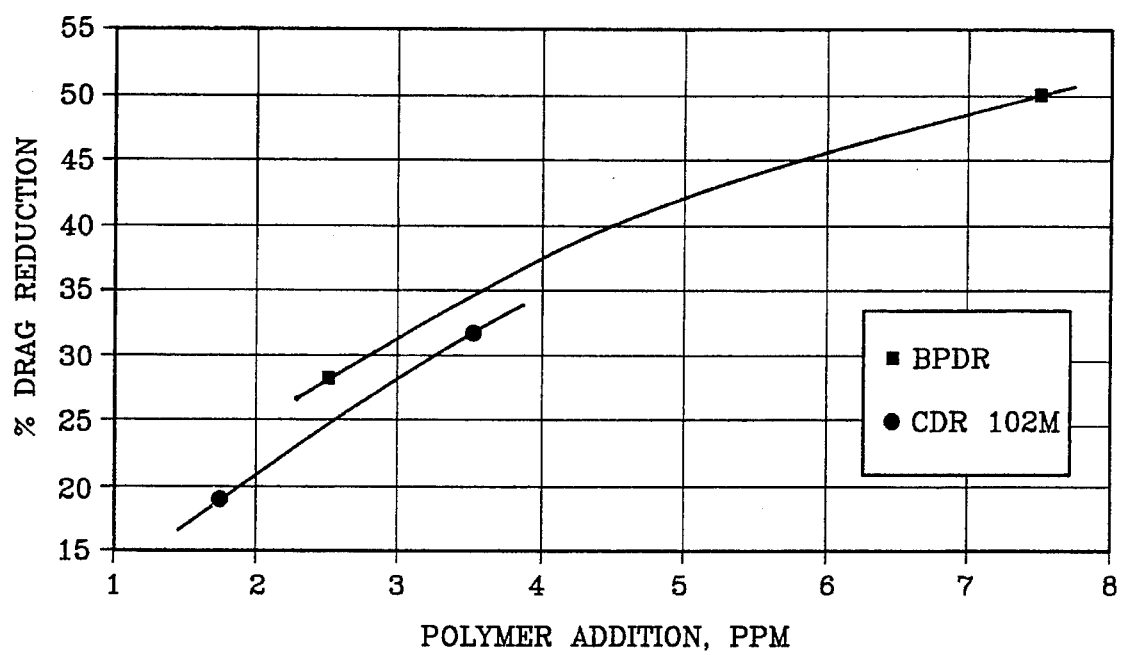
FIG. 1 is a graphical comparison of bulk polymerized and solution polymerized drag reducers in a 12.25 inch diameter pipeline.

The present invention comprises a process for production of olefin monomers via bulk polymerization to produce a substantially non-crystalline, hydrocarbon soluble, ultra-high molecular weight drag reducing polymer. The polymer is produced by the bulk polymerization of olefins containing from 2 to 30 carbon atoms in the presence of a polymerization catalyst under polymerization conditions while removing sufficient heat of reaction to obtain a polymer having an inherent viscosity (IV) of at least 25 deciliters per gram (dL/g). Because of the extremely high molecular weights obtained, the procedure for determining IV was modified, using a four bulb shear dilution viscometer, and measuring at 0.05 gram (g) of polymer/100 milliliters (ml) of hexane solvent at 25° C. and a shear rate of 300 sec$^{-1}$ where the results of the high shear bulb are not used.

It is distinctly surprising that bulk polymerization is capable of producing such high molecular weight non-crystalline polymers. The drag reducing art has hitherto taught that it is necessary to keep monomer concentrations low (below 20% by weight total polymer) in solution polymerizations in order to achieve molecular weights capable of imparting good drag reduction (U.S. Pat. Nos. 4,358,572, 4,415,714, 4,433,123, 4,493,903), and preferably carrying out polymerizations at as low a temperature as possible consistent with commercial production. U.S. Pat. No. 4,384,089 requires a significant portion of the reaction be carried out at low temperatures and the monomer is chilled.

Solid polymers had previously been made by conventional solution polymerizations followed by removing the solvent before grinding. Bulk polymerization was attempted as an approach to make a substantially solvent-free polymer for grinding to avoid this solvent removal step. Bulk polymerization was expected to eliminate the solvent removal step but it was expected that because of the temperatures reached and lower molecular weights expected that more polymer would be needed to obtain an equivalent drag reduction. Obtaining a higher molecular weight polymer from bulk polymerization was not expected in view of the art. Bulk polymerization includes cases where conversion of monomer is not total, and cases where some solvent is added to modify reaction kinetics.

Throughout this specification and claims, the term "bulk polymerization" means that the polymerization medium contains primarily catalyst and alpha-olefins. Although some diluent hydrocarbons can be present, all reactive olefins are normally reacted. The reaction medium will normally contain at least 80% reactive olefins by weight, and normally these olefins are completely reacted, resulting in polymer contents of at least 80% by weight, based on the total reactor content. Preferably the olefins comprise at least 90% by weight, and most preferably 95% by weight of the reaction medium.

We have now discovered that even though lower molecular weights are produced as monomer concentration is increased in solution polymerizations, this result does not extrapolate to very high monomer concentrations such as in bulk polymerization. Bulk polymerization of alphaolefins such as 1-decene appears to follow different kinetics. We have surprisingly found that ultra-high molecular weights are produced at relatively high temperatures and at high monomer concentrations, contrary to conventional teachings on production of drag reducers. These ultra-high molecular weight polyolefin drag reducers are significantly larger (molecular weight basis) than the best molecular weights made by solution polymerization.

Thus the present discovery that bulk polymerization can be carried out starting at near room temperature and undergoing a heat rise of as much as 60° F. while producing a polymer with a molecular weight too high for conventional IV procedures is wholly unexpected. In a preferred embodiment, the polymers of the present invention are used in the form of a finely divided, substantially non-crystalline ultra high molecular weight hydrocarbon soluble polyolefin which is useful to improve the flow of hydrocarbons, which comprises:

(a) combining at least one olefin containing from 2 to 40 carbon atoms capable of being polymerized to form a non-crystalline, ultra-high molecular weight polyolefin with a polymerization catalyst in a thin walled impermeable organic polymer reaction enclosure capable of substantially preventing passage of oxygen and water into the reaction enclosure, the enclosure being of such size and shape as to effect high heat conductivity from the reaction enclosure contents to the exterior environment, (b) polymerizing the olefin to produce a non-crystalline, ultra-high molecular weight polyolefin while removing sufficient heat from the reacting polyolefin in the reaction enclosure to maintain the reaction at a temperature suitable for production of non-crystalline, ultra-high molecular weight polyolefin for a time sufficient to obtain such polymer, (c) cooling the obtained polymer and the enclosure to a cryogenic temperature, and (d) reducing the reaction enclosure and obtained polymer to a finely divided state at a cryogenic temperature below the glass transition temperature of the polymer.

The term "substantially" as used in this specification and claims means that the reaction enclosure is capable of excluding sufficient oxygen and water to permit the polymerization to occur, and recognizes that incidental amounts of water and oxygen may in fact pass through the reaction enclosure.

It is generally recognized that a problem with bulk polymerization is removing the high heat of reaction, since temperatures reached can rise 500° F. up to about 80° F. As is set forth in Mack, U.S. Pat. No. 4,358,572, molecular weight of the final product is very sensitive to the temperature of the polymerization reaction. A change of 10° F. in the starting temperature can change the inherent viscosity (an indirect measurement of molecular weight) by one unit or more.

Surprisingly, in the present invention, we have found that an ultra high molecular weight material can be obtained without cooling the feed or cooling the reaction mixture to low temperatures. Reactions of the present invention optionally can be conveniently started at room temperature and the temperature rise is held to about 60° F. to provide an ultra high molecular weight polymer. This is surprising in view of the experience gained with solution polymerization, where feeds and reactants must be cooled in order to maintain the temperature rise as low as possible in order to maximize molecular weight. In solution systems, temperature rise increase as the reactant concentration increases resulting in a significant loss in molecular weight in the produced polymer. However, at levels near 100 percent monomer, seen in bulk polymerizations, while an even greater temperature rise does occur than in solution systems, production of lower molecular weight polymers does not occur to a significant degree, which is extremely surprising.

None the less, it is necessary to control the heat rise in bulk polymerizations in order to obtain maximum molecular weight (inherent viscosity) required for best drag reduction. We have determined that there exists a maximum reaction enclosure dimension above which reaction heat cannot be removed faster than generated by the reaction. In polymerization reactions using the olefins described, the maximum thickness is estimated to be about 9 inches. However, in order to keep the temperatures sufficiently low to make ultra high molecular weight polymer everywhere in the reaction container, it is preferred to design reaction enclosures as small as possible in the various dimensions. It has been found that reaction vessels must be shaped such that maximum surface area is exposed to a cooling medium in order to achieve ultra high molecular weight.

The Reaction Enclosure

Polymeric bottles and bags have been evaluated and found to be effective polymerization reaction vessels (reaction enclosures). However, the produced polymer is extremely adherent to the walls of such reaction vessels, and therefore polymeric reaction vessels are ground together with the final product in forming the drag reducing materials of the present invention. It is, of course, possible to carry out bulk polymerization in conventional reactors, belt polymerization systems, clam-shell reactors or reactions in single-layer polymer reactors (bottles or bags). While all reactor styles can be used, the presently described preferred embodiments are simply the most effective means found to date.

The bulk polymerizations of the present invention can be carried out using any olefin polymerization catalyst, but it is preferred to carry out the reaction in the presence of Ziegler-Natta catalysts. These catalysts are notoriously sensitive to oxygen and water. Accordingly, the reaction enclosures must be made of barrier polymers which are capable of excluding air and water from the reaction mixture during the time the reaction is taking place. These barrier polymers are crystalline and are non-soluble in hydrocarbons in which the drag reducing non-crystalline polymers are soluble at ambient conditions, such as crude oil and refined fuels. Cross-linking may be present in these barrier polymers.

The invention has been demonstrated with bottles and bags containing five to seven layers, including a water impervious polyolefin such as polypropylene, polyethylene, polybutylene, a bonding polymer, and ethylene vinyl alcohol copolymer oxygen barrier, another bonding polymer, and externally coated with polyethylene, polypropylene or polybutylene. Use of polyethylene terephthlate as an additional layer to add reactor strength at high temperatures is most preferred. Ethylene vinyl alcohol copolymer is an excellent oxygen barrier but a poor water barrier, while polyethylene, polypropylene, polybutylene and the like are excellent water barriers but do permit the passage of oxygen. As these barrier materials do not have good mutual adhesion, a polymer designed to adhere to both is sandwiched between these materials. An example of the bonding polymer are the coextrudable adhesive polymers sold under the trademark "BYNEL" by the DuPont Company.

The ethylene vinyl alcohol also has better oxygen barrier properties when dry, and placing the ethylene vinyl alcohol layer interior to the water resistant exterior polyolefin materials enhances its oxygen barrier effectiveness. A function of the polyolefin layer adjacent the reaction mixture is to protect the catalyst from the functional groups on the ethylene vinyl alcohol copolymer.

Although these reactor materials have been used successfully, it is apparent that substitutions can be made. For example, some nylons and polyesters have adequate oxygen barrier properties. Most thermo-plastic, crystalline polyolefins could replace those mentioned for forming the bottles and bags. However, for cost effectiveness and readily available materials, the ones specifically mentioned are preferred though there is no technical reason not to substitute other materials capable of similar performance. The presence of the finely ground disposable reactors surprisingly does not have an adverse effect on drag reduction or on the hydrocarbon in which the drag reducer is dissolved. Since the drag reducing polymer is normally present at levels no higher than 50 parts per million (ppm) in the hydrocarbon, the disposable reactor particles are present at levels of less than 1 ppm.

The Catalysts

The Ziegler-Natta catalysts used can be any of those described in the art. Particularly useful materials are those described in U.S. Pat. Nos. 4,945,142, 4,358,572, 4,371,455, 4,415,714, 4,333,123, 4,493,903 and 4,493,904. Interestingly, it was discovered that to some degree the concentration of catalyst which is optimum depends upon the dimensions of the reaction vessel, which is most likely related to the higher temperature which results from larger vessels. Cooling can compensate for differences in catalyst concentration to some degree. In bulk polymerization systems, catalysts are used typically at a concentration of 3500 moles monomer per mole transition metal halide in the catalyst, although ratios can vary from as low of 500/1 to as high as 10000/1 or more. Catalyst concentration affects rate of reaction and temperature as well as molecular weight.

The Inherent Viscosity Test

Utilizing these catalysts in bulk polymerizations, consistent conversions of more than 95 percent polymer by weight can be obtained, such that the polymer content of the reactor is 80% or more, preferably 0% or more, and most preferably more than 95% by weight non-crystalline drag reducing polymer, based on total reactor content weight. This result is in direct contrast to the teachings of the prior art solution polymerized drag reducing polymers. The molecular weight of the product is so high that inherent viscosity techniques used to measure current commercial products cannot measure the resultant polymer. At the current test concentration (Procedure A) of 0.1 dl/g using toluene solvent the bulk polymerized polymer tends to plug the capillary tubes. IV is utilized as an indirect measurement of molecular weight because the extremely high molecular weight of these materials makes the normal methods of determining molecular weight unreliable. Accordingly, inherent viscosity is determined for bulk polymerized polymers using a Cannon Ubbelohde 4 bulb shear dilution viscometer and a revised procedure to accommodate the extremely high molecular weight (0.05 gram polymer/per 100 millimeters hexane solvent at 25° C.). Inherent viscosities are calculated for each of the last three bulbs (the high shear rate bulb is discounted because of excessive shear thinning) and plotted as a function of average shear rate. The plot was then used to obtain an inherent viscosity at a shear rate of 300 seconds$^{-1}$ (Procedure B). Typical values of bulk-polymers are 27 to 31 dL/g.

As shown by the table below, IV results are about 1.5 times higher for Procedure B. All samples were solution-polymerized polyolefin.

TABLE 1

| Sample | A (dL/g) | B (dL/g) | Ratio B/A |
|---|---|---|---|
| 1 | 15.6 | 23.2 | 1.49 |
| 2 | 15.9 | 23.9 | 1.50 |
| 3 | 15.8 | 23.9 | 1.52 |
| 4 | 15.9 | 24.0 | 1.51 |
| 5 | 15.7 | 23.8 | 1.52 |
| 6 | 15.6 | 24.3 | 1.56 |

The bulk-polymerized polymers of the present invention could not be tested using Procedure A since a solution capable of being tested could not be formed.

Polymers prepared according to the present invention are extremely effective relative to solution-polymerized materials now in commercial use which contain solvent as illustrated in the examples.

Monomers

The present invention can be carried out with a variety of monomers and monomer mixtures. It is only necessary that sufficient high molecular weight monomers (carbon atom contents above about 4) are present to produce a polymer which is ultimately substantially non-crystalline and hydrocarbon soluble. Substantial amounts of lower carbon atom monomers such as ethylene and propylene will ultimately produce a more crystalline product which will be less soluble in flowing hydrocarbons. However, these materials can be present for whatever advantage they offer to particular solution problems in the specific flowing hydrocarbon systems. Thus from 5 to 50 mole percent of a C2 to C4 monomer is entirely feasible while achieving high molecular weights and dissolution in flowing hydrocarbons.

It is particularly useful to utilize mixtures of monomers, individually represented by C2, C3, C4, C5, C6, C8, C10, C12, C14, C16 and the like. Monomer mixtures appear to react at least as fast as individual monomers, but the resultant copolymers appear to have less crystallinity than homopolymers because of the different monomers used. Lack of crystallinity is extremely advantageous in dissolution of the materials in the flowing hydrocarbon, with resultant increase in drag reduction. While even carbon atom monomers are mentioned because of commercial availability, no technical reason exists to avoid adding odd carbon atom monomers, if available.

For reactions which are incomplete, removal of unreacted monomer is advantageous, and such can be carried out by vacuum drying and/or vacuum drying with precipitation according to well known techniques. However, it is preferred that a bulk reaction simply be carried out to substantial completion and that the drying step to remove monomer and/or solvent be avoided whenever possible for economical reasons.

The Reaction

In practice, the catalyst and monomer are combined in a reaction vessel and agitated at ambient conditions for a period of time sufficient to increase viscosity of the reactants sufficiently to suspend the catalyst and then placed into a cool environment to allow the reaction to proceed. The cool environment is normally maintained at a temperature from about 0° F. to about 80° F., allowing the reaction to proceed at a relatively constant pace, while removing heat and forming ultra high molecular weight polymers. Conversions of more than 95 percent can be obtained, although reaching such conversion levels may require several days.

Slurry Formation

At the completion of bulk polymerization, the entire reaction vessel can be cryoground or for handling purposes can be chopped and the chopped particles then cryoground in a cold mill. It is most convenient and economical to cryogrind utilizing liquid nitrogen to freeze the material below the glass transition temperature of the polymers. During this cryogrinding a coating agent, sometimes referred to as a partitioning agent, is normally added to prevent the freshly exposed surfaces from sticking together.

Representative but non-exhaustive examples of suitable coating agents are alumina, silca, calcined clay, talc, carbon black, calcium stearate, magnesium stearate. The level of coating agent may vary depending on the coating agent used but can be up to about 30 to 35 percent based on weight of polymer. Blends of coating agents can be used and may be desirable for creating a stable slurry.

Once cryoground, the material is slurried in water or a water-alcohol solution. Alcohols which are effective are alcohols which are miscible in water in the proportion used, such as ethanol, propanol, isopropanol, butanol, isobutanol and the glycols such as ethylene glycol and propylene glycol. Mixtures of alcohols can also be used. It is only necessary that the alcohols used form a continuous phase with the water and any viscosifying agents and surfactants used.

It is necessary to obtain a stable slurry in order to obtain a satisfactory commercial product. Stability can be achieved by increasing the viscosity of the water phase, but it is necessary that the viscosity of the final slurry be sufficiently low to flow by gravity to an injection pump for insertion into the flowing hydrocarbon. In order to increase the viscosity of the slurry, one or more water soluble polymers can be utilized. Such water-soluble polymers are non-exhaustively represented by carboxymethyl cellulose, hydroxyethyl cellulose, hydroxypropyl guar, and xanthan gum.

Surfactants are normally but not critically used in producing a stable slurry. Surfactants which reduce flocculation and increase the level of solids content can be added.

A large number of surfactants or combinations of surfactants can be utilized. Preferred surfactants are non-ionic surfactants and anionic surfactants.

Optionally, when necessary, biocides and defoamers can be utilized to prevent bacterial growth in the slurry mixture and to prevent foaming during formation and pumping of the slurry itself. Representative but non-exhaustive examples of defoaming materials are the Antifoam agents, trademark of and sold by Dow Corning, Midland, Mich., USA, and the Bubble Breaker products, trademark of and sold by Witco Chemical Company, Organics Division.

Representative but non-exhaustive examples of biocides are water soluble polyoxymethylenes such as Dowicil, trademark of and sold by the Dow Chemical Company, and Proxel BD, trademark of and sold by ICI Americas Inc.

The invention is more concretely described with reference to the examples below wherein all parts and percentages are by weight unless otherwise specified. The examples are provided to illustrate the present invention and not to limit it.

EXAMPLE 1

A catalyst slurry was prepared by combining 0.40 grams of $TiCl_3.AA$ in solvent (solvent level is chosen to be sufficient to agitate the $TiCl_3$. AA) together with dibutyl ether promoter according to the teachings of Mack U.S. Pat. No. 4,416,714. The mixture was agitated for 30 minutes, and aluminum alkyl co-catalyst was added. The catalyst slurry was then agitated for 30 minutes.

A 40 ounce (1.18 liter) laminated barrier bottle was filled with 1000 grams of decene and aluminum alkyl cocatalyst before being purged with nitrogen and dried. Catalyst was injected into the bottle to activate the polymerization reaction. Each bottle was shaken for 5 to seconds, then put into a rolling tube to continue agitation for about 3 minutes. When the bottles emerged from the roller the reaction had proceeded to the extent that the decene had viscosified such that the catalyst did not settle. The bottles were placed into a refrigerated room at 12° F. After 24 hours the bottles were returned to ambient conditions and allowed to stand for two weeks to complete the polymerization.

| Catalyst Activation | |
| --- | --- |
| $TiCl_3.AA$ | 0.40 grams |
| | (2.0 m moles) |
| slurry in approximately 40 ml solvent | |
| (solvent level is chosen to be sufficient to agitate | |
| the $TiCl_3$,) | |
| Dibutyl ether | 0.38 ml |
| | (2.2 m moles) |
| agitate for 30 minutes | |
| Diisobutyl aluminum chloride | 4.0 ml |
| (25% in heptane) | (4.0 m moles) |
| agitate for 30 minutes | |
| Reaction in 40 Ounce Polymerization Bottle | |
| Decene | 1000.0 grams |
| Diisobutyl Aluminum Chloride | 10.0 ml |
| (25% in heptane) | |
| Catalyst from above recipe | 4.0 ml |

Such a catalyst typically has about 95% conversion to polymer having an inherent viscosity of 28 dl/g.

EXAMPLE 2

A second catalyst was prepared using the following recipe and method of preparation:

| | |
| --- | --- |
| $TiCl3\ AA$ | 0.40 grams |
| | (2.0 m moles) |
| slurry in approximately 40 ml solvent, | |
| such as hexane | |
| (solvent chosen to be sufficient to | |
| agitate the TiCl3) | |
| Dibutyl ether | 0.38 ml |
| | (2.2 m moles) |
| Agitate 30 minutes | |
| Diisobutyl aluminum chloride | 4.0 ml |
| (25% in heptane) | (4.0 m moles) |
| Agitate 20 minutes | |
| Polyethylene siloxane (PMMS) | 2.0 ml |
| | (2.0 m moles) |
| Agitate 10 minutes | |

Typical results will closely compare to those for the recipe derived in Example 1.

EXAMPLE 3

Catalyst prepared as in Examples 1 or 2 can be prepared utilizing other ethers in the catalyst activation recipe. Dibutyl ether can be substituted by any one of benzyl ether, n-propyl ether, isopropyl ether, methyl tert-butyl ether, and diethyl ether. These promoters are shown experimentally by Mack in U.S. Pat. No. 4,416,714 to increase inherent viscosity of produced polymers at a decreased rate. In the bulk polymerization systems of the present invention the rate decrease is not significant and these materials will produce effective drag reducing polymers.

EXAMPLE 4

The catalyst preparation of Examples 1 and 2 is repeated utilizing catalyst described in Mack U.S. Pat. No. 4,493,903 utilizing $TiCl_3AA$ 1.13 a camphor-modified $TICl_3$. A phosphorous-containing catalyst modifier is substituted for the ether. The resulting polymer will have comparable IVs to those shown in Example 1 and will be an effective drag reducer. The following catalyst preparation is utilized.

| Catalyst Preparation: | |
| --- | --- |
| TiCl3 AA (Type 1.13) | 0.40 grams (2.0 m moles) | slurry in approximately 40 ml solvent, such as hexane (solvent chosen to be sufficient to agitate the TiCl$_3$)

| | |
| --- | --- |
| Triphenylphosphine | 0.45 ml (0.3 m moles) |
| Agitate 30 minutes | |
| Diisobutyl aluminum chloride (25% in heptane) | 4.0 ml |
| Agitate 30 minutes | |

EXAMPLE 5

Using a process similar to that described in Example 1, bulk polymerized material was produced in numerous bottles. Bottle lids were removed and the bottles were chopped into chunks averaging about ½ inch (13 mm) in diameter for ease of handling. The chunks were then cryoground under liquid nitrogen together with the reaction vessels to obtain a free-flowing finely divided powder in the presence of a calcium stearate partitioning agent.

The cryoground free-flowing powder and partitioning agent were allowed to warm to ambient conditions at room atmosphere. The warmed particles were then slurried and suspended. The final suspension contained:

86 grams ground powder (30% solids loading in the slurry)

1 gram Dowicil 75, trademark of and sold by Dow Chemical Company, as biocide 5 grams Antifoam 1410, a silicon-based antifoam trademark of and sold by Dow Corning Corporation 1 gram non-ionic surfactant (Triton X-45, trademark of and sold by Union Carbide)

1.2 grams hydroxyethyl cellulose.

The mixture was mixed at high speed for 20 minutes and produced a stable, latex-like slurry.

In the examples which follow, actual drag reduction data is presented. Drag reduction data was obtained from a one-inch test loop as well as pipelines at various diameters. A difference in drag reduction will be noted for both the prior art drag reducing material and the present invention drag reducing material between the loop and the commercial pipeline data. The reason for this is the difference in pipeline diameter affects Virk's limit, which sets the theoretical level drag reduction can reach. For although rendition, reference is made to the article "Drag Reduction Fundamentals" by P.S. Virk, *AIChE Journal*, Volume 21, No. 4, Jul., 1975, hereby incorporated by reference. This article provides a complete review on the subject of drag reduction in turbulent flow using dilute polymer solutions. Precisely stated, the article describes three regimes for fully turbulent pipe flow of dilute polymer solutions, appearing in the following order as flow rate increases.

(1) A first regime without drag reduction where the friction factor/Reynolds number relationship is the same as for the solvent.

(2) The second regime is a drag reduction regime in which the friction factor depends on the nature of the polymer solution, such as the polymer concentration and molecular weight.

(3) The third regime is an asymptotic regime of maximum possible drag reduction described as a universal rule that depends only on Reynolds number and is independent of additive properties or concentrations.

Using the equations provided in the referenced article, it is possible to calculate the maximum possible drag reduction for a given flow situation using Virk's equation and an iterative calculation. To illustrate, in the present examples listed below in a one-inch loop with diesel fuel at a flow rate of 10.5 gallons per minute, the maximum drag reduction asymptote according to Virk's is about 65 percent. In contrast, in an 18-inch pipeline flowing with a Reynolds number of about 200,000, the Virk's maximum drag reduction asymptote is 85 percent.

EXAMPLE 6

The slurry described in Example 5 was field tested in a 29.3 mile long, 12.25 inch diameter pipeline carrying crude oil 28.4° API (Alaska North Slope or ANS and ° API West Texas Intermediate or WTI). Normal pipeline throughput is 3600 to 4400 barrels per hour (BPH) depending on crude oil and ambient temperature. The polymer slurry described was injected into the pipeline at constant ppm levels and drag reduction was monitored over the 29.3 mile live. The results are set out in Table 2.

TABLE 2

| Oil Type | Pipeline Throughput (BPH) | Temp. Oil (°F.) | Oil Visc. (cst.) | Polymer Addition (ppm) | % Drag Reduction |
| --- | --- | --- | --- | --- | --- |
| ANS | 3830 | 74 | 25 | 7.46 | 50.3 |
| ANS | 3990 | 74 | 25 | 2.56 | 28.6 |
| WTI | 4400 | 71 | 7.4 | 7.38 | 55.0 |
| WTI | 4420 | 71 | 7.4 | 4.88 | 44.9 |
| WTI | 3720 | 52 | 10.1 | 4.3 | 43 |
| WTI | 3620 | 52 | 10.1 | 2.5 | 32 |

EXAMPLE 7

The same pipeline described in Example 6 was used in field tests of a conventional, commercially available drag reducing polymer prepared by solution polymerization techniques and contains about 7.1% active polymer (CDR® 102M, trademark of and sold by Conoco Specialty Products Inc.). The drag reducer was inserted into the pipeline at constant ppm levels and the drag reduction was monitored over the 29.3 mile pipeline. The results are set out in Table 3.

TABLE 3

| Oil Type | Pipeline Throughput (BPH) | Temp. Oil (°F.) | Oil Visc. (cst.) | Polymer Addition (ppm) | % Drag Reduction |
| --- | --- | --- | --- | --- | --- |
| ANS | 3570 | 90 | 18 | 1.8 | 19.5 |
| ANS | 3520 | 90 | 18 | 3.5 | 32.0 |
| WTI | 4500 | 90 | 5.6 | 1.7 | 24.5 |
| WTI | 4500 | 90 | 5.6 | 3.5 | 40.6 |

While the bulk polymerized polymer was chopped, cryoground and agitated in a solvent, all of which procedures degrade molecular weight, it was surprising to note that when compared to the solution polymerized polymer in commercial use that the bulk polymerized polymer performed better (FIG. 1). On an active polymer content basis, the bulk polymerized, slurried drag reducer provided more drag reduction than current commercial drag reducers tested as solution polymerized reaction products. For solution produced polymers which had been dried (solvent removed), cryoground, slurried and injected, a large loss in drag reduction efficiency is seen. The comparison is set out in FIG. 2.

Figure 2:
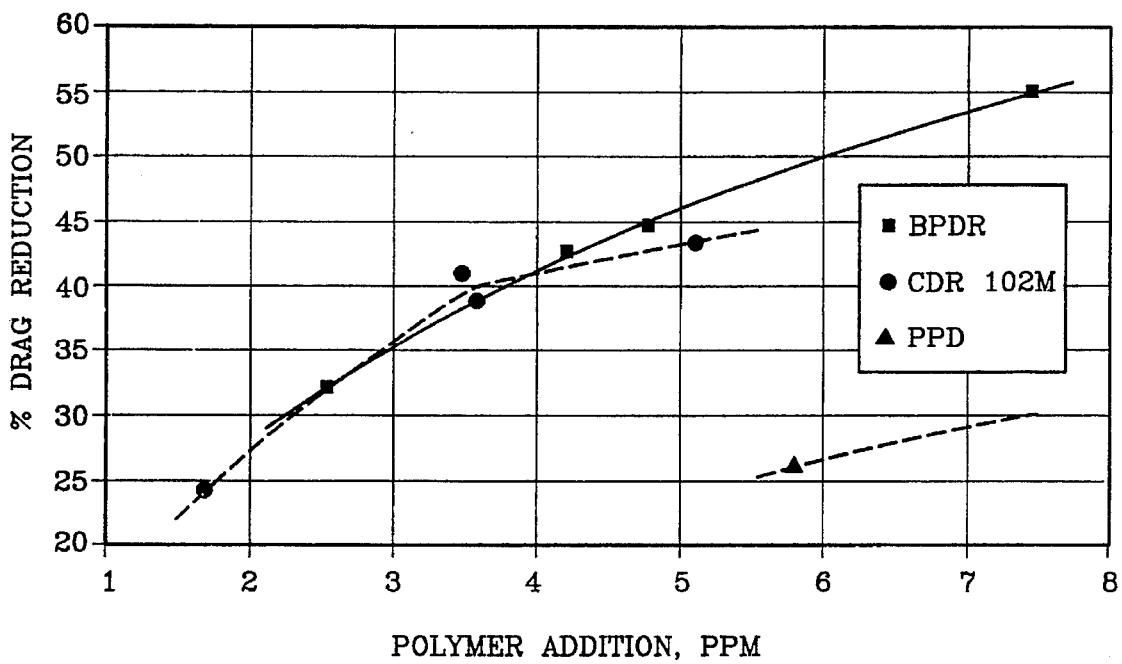
FIG. 2 is a graphical comparison of bulk polymerized drag reducing polymers against solution polymerized drag reducing polymers which were recovered from solution, chopped and dried, and also against solution polymerized drag reducers wherein the polymerization reaction product is used as a drag reducer.

In FIGS. 1 and 2, CDR® 102M is a trademark of and sold by Conoco Specialty Products Inc. BPDR means bulk polymerized drag reducer. PPD means precipitated, cryoground 102M. All plots are on a comparative, active polymer basis. The results show that even after undergoing mechanical shear, mixing agitation and use in a colder, more viscous crude, the drag reducers of the present invention are generally superior to current commercial products. A commercial product (CDR® 102M) precipitated from solution, cryoground and suspended in water in the same fashion as the bulk-polymerized polymer of the present invention shows markedly lower drag reduction under the conditions of FIGS. 1 and 2.

EXAMPLE 8

A one-inch flow loop circulating #2 diesel oil at a rate of 10.5 gallons per minute was used to provide comparisons between CDR® 102M, trademark of and sold by Conoco Specialty Products, with the bulk polymerized polymer of the present invention CDR® 102M is a solution polymerized polyolefin at a concentration of about 10% polymer in solvent and is physically in the form of a viscous gel (hereinafter gel). The samples compared are typical polydecenes from commercial production and have the following IV's:

|  | Method A | Method B |
|---|---|---|
| gel | 15.6 dL/g | 23.2 dL/g |
| bulk | — | 27.8 dL/g |

In carrying out the tests, the drag reducing gel and bulk polymerized drag reducer were predissolved in heptane, then metered into the flow loop at a rate sufficient to meet test concentrations. Drag reduction was determined by measuring the pressure drop 100 feet from the insertion point, and calculated using the formula $$\% \text{ Drag Reduction} = \frac{\Delta P}{P} \times 100$$

where $\Delta P$ is the difference between the original pressure without drag reducer (P) and the pressure with drag reducer.

In FIG. 2, it is evident that precipitation and cryogrinding degrades the polymer. Cryogrinding alone also degrades the polymer, but not to the same extent. The drag reduction efficiency of a powder made by cryogrinding the bulk-polymerized polymer is compared to the unground bulk-polymerized polymer and to the current commercial gel in

TABLE 4

| Drag Reducer Polymer (PPM) | Gel % DR | Bulk % DR | Cryoground Bulk % DR |
|---|---|---|---|
| 1.52 | 53 | 61 | 63 |
| 1.14 | 45 | 59 | 61 |
| 0.57 | 29 | 44 | 41 |
| 0.29 | 16 | 27 | 22 |

The higher levels of drag reduction for the cryoground powder compared to the same starting material are identical to each other within the accuracy of the experiment.

Using the data of Table 4, the concentration of active polymer needed to give drag reduction at target levels was interpolated using best fit correlations of the data. The results are shown in Table 5, where parts per million (ppm) polymer represent active polymer.

TABLE 5

| Target Drag Reduction (%) | Concentration of Gel Needed (PPM) | Conc. Bulk Needed (PPM) | % Additional Gel Needed to Reach Target |
|---|---|---|---|
| 26 | 0.5 | 0.3 | 67 |
| 45 | 1.1 | 0.6 | 83 |
| 59 | 1.5 | 0.8 | 88 |

The bulk polymerized polymer approaches Virk's asymptote in this short test segment. Differences between the polymers are apparently disguised at higher concentrations because Virk's asymptote is approached. This effect at higher concentrations is true only in short laboratory test loops where flow degradation is not significant.

Virk's asymptote is never actually achieved in commercial pipelines because polymer degradation occurs in normal turbulent flow over the distances of commercial interest. However, because of its higher molecular weight, the bulk-polymerized polymer can achieve a higher level of drag reduction in commercial pipelines than is possible with solution-polymerized polymers. The higher molecular weight of bulk-polymerized drag reducers is evidenced in higher IV's and in higher levels of drag reduction.

EXAMPLE 9

A test was carried out in a 26-inch pipeline transporting 26000 barrels per hour (BPH) of a low sulfur (sweet) crude. A comparison of bulk polymerized drag reducer against a plot of predicted drag reduction values was made. The predicted values are based on more than 15 years experience and correlates oil properties, flow rate and pipe diameter. The active polymer was polydecene in both the solution-polymerized drag reducer and the bulk-polymerized drag reducer polymerized in consumable containers as described in the present invention, then chopped, cryoground in the presence of calcium stearate, and slurried in water. The test was carried out to demonstrate the feasibility of closing an intermediate pump station using the bulk-polymerized polymer. The solution-polymerized polymer was CDR® 102M, sold by Conoco Specialty Products.

TABLE 6

| Polymerization Method | Actual Polymer (PPM) | Drag Reduction (%) | |
|---|---|---|---|
| | | Active | Predicted |
| solution | 0.7 | 17 | 18 |
| solution | 1.4 | 23 | 27 |
| bulk | 2.7 | 54 | 37 |
| bulk | 5.6 | 60 | 48 |

Note should be taken that the bulk polymer performed significantly better (based on polymer concentration and predicted results) than the solution-polymerized polymer, which did not meet predicted levels.

EXAMPLE 10

The test described in Example 9 was repeated in a 12-inch pipeline transporting 2500 barrels per hour (BPH) of a low sulfur (sweet) crude. Test results are reported on the same basis as Example 9.

TABLE 7

| Polymerization Method | Actual Polymer (PPM) | Drag Reduction (%) | |
|---|---|---|---|
| | | Active | Predicted |
| solution | 11.4 | 62 | 56 |
| solution | 16.3 | 65 | 59 |
| bulk | 2.9 | 53 | 40 |
| bulk | 4.6 | 61 | 47 |
| bulk | 5.4 | 60 | 49 |
| bulk | 5.4 | 66 | 49 |
| bulk | 6.8 | 68 | 51 |
| bulk | 8.8 | 74 | 54 |

Based on the polymer concentrations in parts per million (ppm), the data shows a significant increase for the bulk-polymerized polymer, even after cryogrounding and slurrying as described in the present invention. Although both polymers exceeded the predicted drag reduction, clearly the bulk polymerized polymer was superior on a polymer basis.

While certain embodiments and details have been shown for the purpose of illustrating this invention, it will be apparent to those skilled in this art that various changes and modifications may be made herein without departing from the spirit or the scope of the invention.

We claim:

1. A drag reducing composition comprising:
   (a) a high molecular weight, substantially non-crystalline, hydrocarbon-soluble polyolefin polymer formed by polymerizing at least one olefin containing from 2 to 40 carbon atoms,
   (b) at least one crystalline, hydrocarbon-insoluble water barrier polymer and/or oxygen barrier polymer, and
   (c) a suspending medium selected from the group consisting of water and water-alcohol mixtures.

2. The composition of claim 1 wherein the water barrier polymer and oxygen barrier polymer are different polymers.

3. The composition of claim 2 wherein at least one non-agglomeration coating selected from the group consisting of alumina, silica, carbon black, inorganic clays, talc, and a metal stearate is present.

4. The composition of claim 2 wherein a surfactant is present.

5. The composition of claim 4 wherein the surfactant is present at a levels up to about 3 weight percent based on total suspension weight.

* * * * *

UNITED STATES PATENT AND TRADEMARK OFFICE
CERTIFICATE OF CORRECTION

PATENT NO. : 5,504,132

DATED: April 2, 1996

INVENTOR(S): Ken W. Smith, Leo V. Haynes, and Debora Flanagan Massouda

It is certified that error appears in the above-identified patent and that said Letters Patent is hereby corrected as shown below:

Column 7, line 21, "80°F" should be --580°F--.

Column 9, line 17, "0%" should be --90%--.

Column 10, line 62, "silca" should be --silica--.

Column 11, line 60, after the word to, "10" was inadvertently omitted.

Column 13, line 52, "although" should be --a thorough--.

Column 14, line 19, after the word and, "38" was inadvertently omitted.

Signed and Sealed this

Second Day of July, 1996

Attest:

BRUCE LEHMAN

Attesting Officer

Commissioner of Patents and Trademarks